Aug. 8, 1939.   P. S. JONES   2,169,151
SHOETREE
Filed June 1, 1938
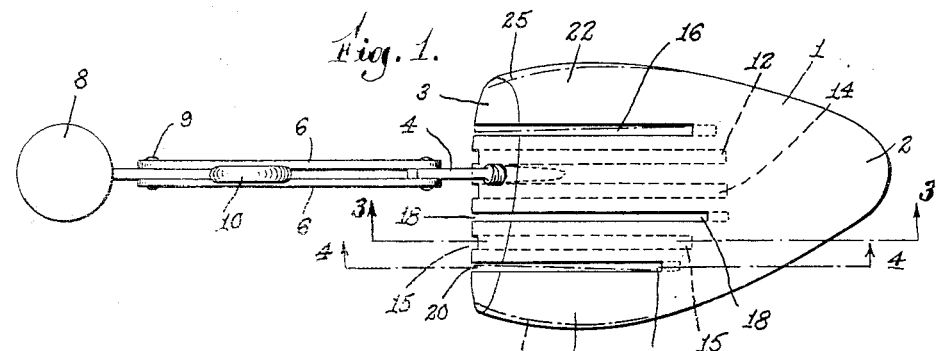
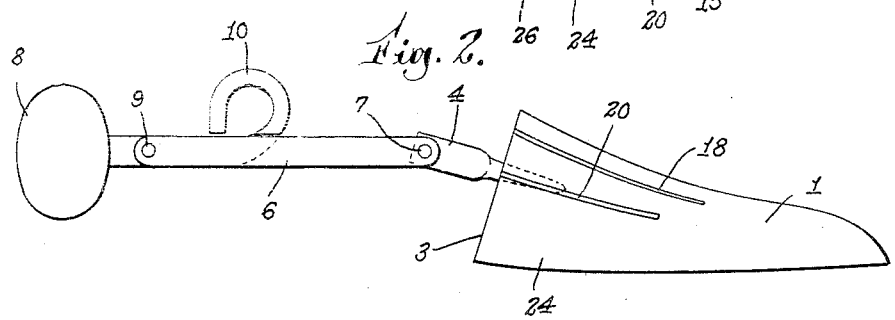
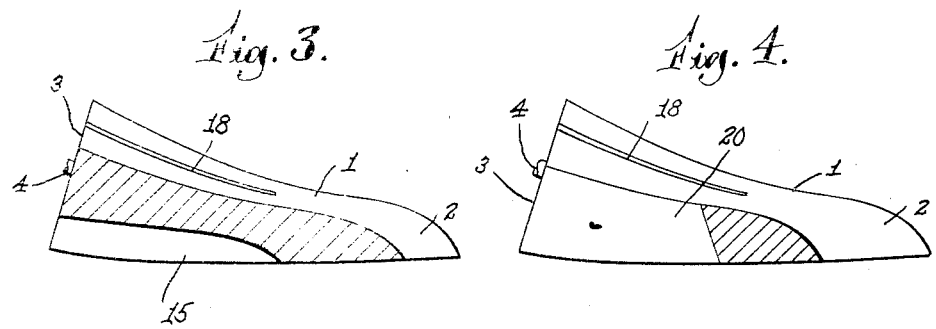
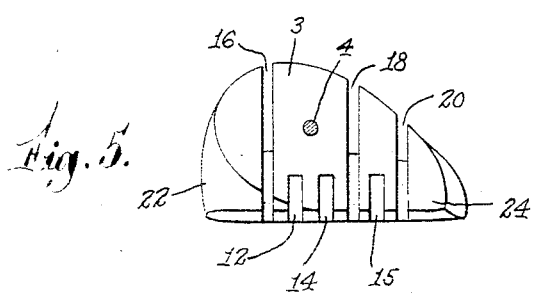
Inventor
Paul S. Jones
by James R. Hodder
Attorney Patented Aug. 8, 1939

2,169,151

UNITED STATES PATENT OFFICE 2,169,151

SHOETREE

Paul S. Jones, Brockton, Mass., assignor to Jones & Vining, Inc., Brockton, Mass., a corporation of Massachusetts Application June 1, 1938, Serial No. 211,148

1 Claim. (Cl. 12—128.1)

My present invention is a novel and improved ventilated shoe tree and includes the novel method of making the same.

In my prior and copending application, Ser. No. 203,543, I have illustrated, described, and claimed broadly a ventilated shoe tree having the forepart constructed and arranged with a side portion capable of "springing" widthwise and thus providing an automatic self-adjustment widthwise to fit shoes of varying widths to a considerable range, as well also to exert an outward tension on the shoe to which the tree is fitted.

In my present construction, I have improved and perfected this widthwise springing or adjusting feature and action, together also with a further ventilating feature, as will be explained.

In carrying out my invention, I utilize a forepart of wood, plastic, or other suitable material and form the same with a plurality of longitudinal grooves opening from the bottom surface of the last and extending to the rear wall or face of the forepart, together also with a plurality of saw cuts or kerfs severing the forepart from top to bottom and near the outer edge portions. These latter cuts are extended sufficiently forwardly and entirely thru the forepart from top to bottom so as to afford a substantial capacity for widthwise springing action, thus providing an automatic self-adjusting tensioning feature on the shoe to which the tree is fitted.

Also I may, if desired as in said prior application 203,543, apply yielding means such as a flat or coiled spring, rubber, or the like to still further extend these side cut portions, although preferably, and as herein shown, I have not utilized a spring for simplicity and economy in the method of making, as well as in the resultant article, replying upon the normal resiliency and spring feature of the material from which the forepart is turned and made.

Attached to my novel forepart may be any suitable heel-engaging and link portion to give lengthwise adjustment and quick attachability and detachability of the shoe tree with the shoe. As herein shown, for illustrative purposes, I have adopted a similar heel-engaging and link construction as that shown in my said copending application 203,543 but, as above noted, any link and heel member can be utilized.

Referring to the drawing illustrating my improved shoe tree and method of making same, Fig. 1 is a plan view of a preferred embodiment;

Fig. 2 is a side view;

Fig. 3 is a cross-sectional view on the line 3—3 of Fig. 1;

Fig. 4 is a cross-sectional view on the line 4—4 of Fig. 1, and

Fig. 5 is a view of the rear wall or face of the forepart showing the ventilating longitudinal cuts extending partly into the forepart as well as the further ventilating and spring-severing cuts extending entirely thru the forepart from the rear face forwardly.

Referring to the drawing, 1 is a typical forepart model for a shoe tree, which may be of any suitable design, size, shape, or contour to cooperate with the footwear intended to be utilized therewith. Preferably, this forepart will be made slightly larger in width than the inside dimensions of the shoe for which it is intended in order to obtain the advantage of the widthwise spring and tension when fitted within the shoe. The toe portion 2 is left solid in my construction, and the rear wall or face 3 to which an adjustable link 4 is secured by being threaded into a recess in the forepart, or otherwise, has attached thereto a collapsible link comprising the solid members 6 pivoted to the member 4 at 7, and with the heel-engaging member 8 pivoted to the opposite end of the member 6 at 9, together with a finger-holding or hand-operating member 10 at the opposite end of the heel-engaging link, all as shown in my said prior application.

In the forepart a plurality of longitudinal saw cuts are made in the bottom, as indicated at 12, 14, and 15 extending well into the forepart but leaving the toe portion 2 of the forepart solid. In addition to these longitudinal ventilating saw kerfs, I also cut two or more slots, here shown as three in number, 16, 18 and 20 extending entirely thru the forepart from top to bottom. The two outer cuts 16 and 20 are relatively near the edge portions of the forepart, thus forming spring-yielding sections 22 and 24, which, being united at the toe portion 2 and with the open spaces 16 and 20 removed by the saw cuts provide a suitable "spring" for these side sections 22 and 24, as indicated at the dotted line position 25 for the portion 22, and 26 for the portion 24.

Thus I have provided by a simple saw-cutting or slot-forming operation a self-adjusting shoe tree with novel yielding sections at each side, giving a considerable range as well as tension to the shoe into which the tree is fitted. Thus, also, each side portion is independently capable of springing, yielding, and adjusting, thus giving a considerably better fitting action to the shoe as well as a considerable range in width. The openings 16 and 20 may be made of any width desired and extend sufficiently into the toe portion 2 to afford the yield and spring desired.

Furthermore, by having each side edge portion 22 and 24 thus formed to yield only slightly the danger of breakage of such parts with the double yielding feature is much less than where a single opening might be formed to provide lateral spring as, for example, shown in my said prior application 203,543.

Furthermore, the thru slots 16 and 20 afford still further ventilating means opening from the rear wall 3 substantially into the forepart and thus aid in the ventilating afforded by the partial slots 12, 14, and 15, and one or more intermediate slots 18, if the latter is desired, although only the two outer slots 16 and 20 are essential to provide the widthwise adjustment and spring feature, as will be readily appreciated.

I claim:

A ventilated shoe tree of the kind described, having a forepart with a plurality of longitudinal slots extending entirely through from top to bottom of the forepart and a plurality of slots extending for a substantial distance in said forepart and opening from the rear face and bottom only of the forepart the material of said forepart permitting resilient springing action of the side portions to the extent afforded by the width of the slots nearest said side portions, in combination with expansible linkage elements between said forepart and a heel-engaging member.

PAUL S. JONES.